US012454222B2

(12) United States Patent
Stewart

(10) Patent No.: US 12,454,222 B2
(45) Date of Patent: Oct. 28, 2025

(54) MIRROR PIVOT

(71) Applicant: Super ATV, LLC, Madison, IN (US)

(72) Inventor: Jason T. Stewart, Harvest, AL (US)

(73) Assignee: Super ATV, LLC, Madison, IN (US)

(*) Notice: Subject to any disclaimer, the term of this patent is extended or adjusted under 35 U.S.C. 154(b) by 11 days.

(21) Appl. No.: 18/765,950

(22) Filed: Jul. 8, 2024

(65) Prior Publication Data
US 2025/0010796 A1 Jan. 9, 2025

Related U.S. Application Data

(60) Provisional application No. 63/512,156, filed on Jul. 6, 2023.

(51) Int. Cl.
B60R 1/078 (2006.01)
(52) U.S. Cl.
CPC .................. B60R 1/078 (2013.01)
(58) Field of Classification Search
CPC .. B60R 1/078; B60R 1/076; B60R 2011/0033
See application file for complete search history.

(56) References Cited

U.S. PATENT DOCUMENTS

| | | | |
|---|---|---|---|
| 11,180,085 B2* | 11/2021 | Hottmann | B60R 1/1207 |
| 11,890,989 B2* | 2/2024 | Lettis | H04N 23/50 |
| 2021/0061392 A1* | 3/2021 | Lee | B62J 29/00 |
| 2024/0092266 A1* | 3/2024 | Olson | G06F 21/606 |
| 2025/0065806 A1* | 2/2025 | Stewart | B60R 1/078 |
| 2025/0242756 A1* | 7/2025 | Mu | B60R 1/076 |

OTHER PUBLICATIONS https://axlaalloys.com/product/6-convex-glass-folding-side-mirror dated Feb. 11, 2025 (pp. 4).
https://www.cyclegear.com/qualifying-products-parts-accessories dated Feb. 11, 2025 (pp. 11).

* cited by examiner

Primary Examiner — Eret C Mcnichols
(74) Attorney, Agent, or Firm — Woodard, Emhardt, Henry, Reeves & Wagner, LLP

(57) ABSTRACT

A mirror mount assembly that pivots in two directions is disclosed. The mirror mount assembly includes a pivot joint configured to rotate the assembly in a horizontal direction, from the perspective of a driver in the driver seat of a vehicle. The assembly further includes a swivel joint configured to rotate the assembly in a vertical direction. The swivel joint allows a mirror mount to rotate relative to a swivel post. The mirror mount assembly includes a compression assembly configured to adjust the amount of force required to rotate the mirror mount relative to the swivel post.

20 Claims, 11 Drawing Sheets

MIRROR PIVOT

CROSS-REFERENCE TO RELATED APPLICATIONS

This application claims the benefit of U.S. Provisional Application No. 63/512,156, filed Jul. 6, 2023, which is hereby incorporated by reference.

FIELD OF THE INVENTION

This invention relates to mirror mounts attachable to the exterior of a motor vehicle. More specifically, this invention relates to a dual-pivotable mirror mount configured to attach to the exterior of a motor vehicle to serve as a sideview mirror.

BACKGROUND OF THE INVENTION

The present disclosure relates to mirrors for motor vehicles and more specifically to mirrors for All Terrain Vehicles ("ATVs") and Utility Terrain Vehicles ("UTVs"). The use of ATVS or UTVs for recreation or work is an ever-growing industry. Original equipment manufacturer (OEM) exterior mirrors as well as aftermarket $3^{rd}$ party-supplied exterior mirrors provide adequate mirrors for a driver to see a rearward field of view. However, the current exterior mirrors on the market have a host of issues. For example, some exterior mirrors only pivot in one direction, thus limiting the angles and views that the mirror can be adjusted to. Further, these pivot joints are either too loose or too tight, resulting in a mirror that cannot be adjusted without the use of tools or excessive force, or a mirror that does not hold its desired position.

Thus, there is a need for improvement in the field.

SUMMARY OF THE INVENTION

The mirror mount assembly of the present disclosure is configured to provide superior adjustability of the attached side view mirror, such that a driver of the vehicle can adjust the field of view of the mirror to any desired position. This allows the mirror mount assembly to be used for drivers of any height, while still providing a stable, secure mount to ensure the side view mirror is stable at the position set by the driver. The mirror mount assembly includes two pivot points, configured to allow adjustment of the assembly in two different planes. Attachment of a pivot base to a swivel post defines a post joint, wherein the driver can adjust the angle between the swivel post and the pivot base along a horizontal plane. The second pivot point is a swivel pivot defined by attachment of the swivel post to a mirror mount via a joint cap. The swivel pivot allows rotation of the mirror mount relative to the swivel post in a vertical plane. Further, the mirror mount assembly includes a compression assembly configured to adjust the amount of force required to rotate the mirror mount relative to the swivel post.

DETAILED DESCRIPTION

For the purposes of promoting an understanding of the principles of the invention, reference will now be made to certain embodiments and specific language will be used to describe the same. It will nevertheless be understood that no limitation of the scope of the invention is thereby intended, such alterations and further modifications, and such further applications of the principles of the invention as described herein being contemplated as would normally occur to one skilled in the art to which the invention relates. Additionally, in the detailed description below, numerous alternatives are given for various features. It will be understood that each such disclosed alternative, or combinations of such alternatives, can be combined with the more generalized features discussed in the Summary above, or set forth in the embodiments described below to provide additional disclosed embodiments herein.

The mirror mount assembly of the present disclosure is configured to provide superior adjustability of the attached side view mirror, such that a driver of the vehicle can adjust the field of view of the mirror to any desired position. This allows the mirror mount assembly to be used for drivers of any height, while still providing a stable, secure mount to ensure the side view mirror is stable at the position set by the driver. The mirror mount assembly includes two pivot points, configured to allow adjustment of the assembly in two different planes. Attachment of a pivot base to a swivel post defines a post joint, wherein the driver can adjust the angle between the swivel post and the pivot base along a horizontal plane. The second pivot point is a swivel pivot defined by attachment of the swivel post to a mirror mount via a joint cap. The swivel pivot allows rotation of the mirror mount relative to the swivel post in a vertical plane. Further, the mirror mount assembly includes a compression assembly configured to adjust the amount of force required to rotate the mirror mount relative to the swivel post.

Figure 1:
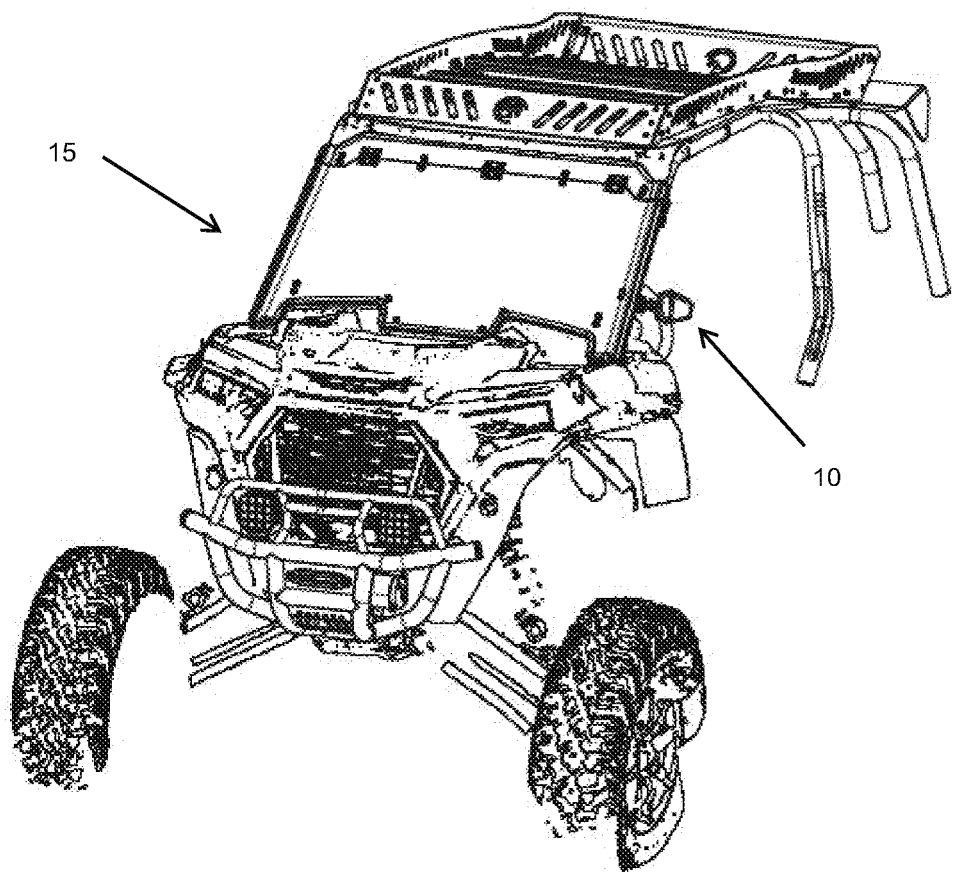
FIG. 1 is a partial, perspective view of an embodiment of a mirror mount assembly attached to the frame of a motor vehicle.

FIG. 1 depicts a mirror mount assembly 10 attached to an exemplar motor vehicle 15. As shown, the mirror mount assembly 10 is attached to the frame of the vehicle 15, thus providing a driver of vehicle 15 with a side view mirror. Although shown on the driver side of the vehicle 15, the mirror mount assembly 10 can be mounted to the passenger side of the vehicle 15, as well. Thus, the vehicle 15 can be outfitted with a mirror mount assembly 10 on the driver side, the passenger side, or both sides of the vehicle 15.

Figure 2:
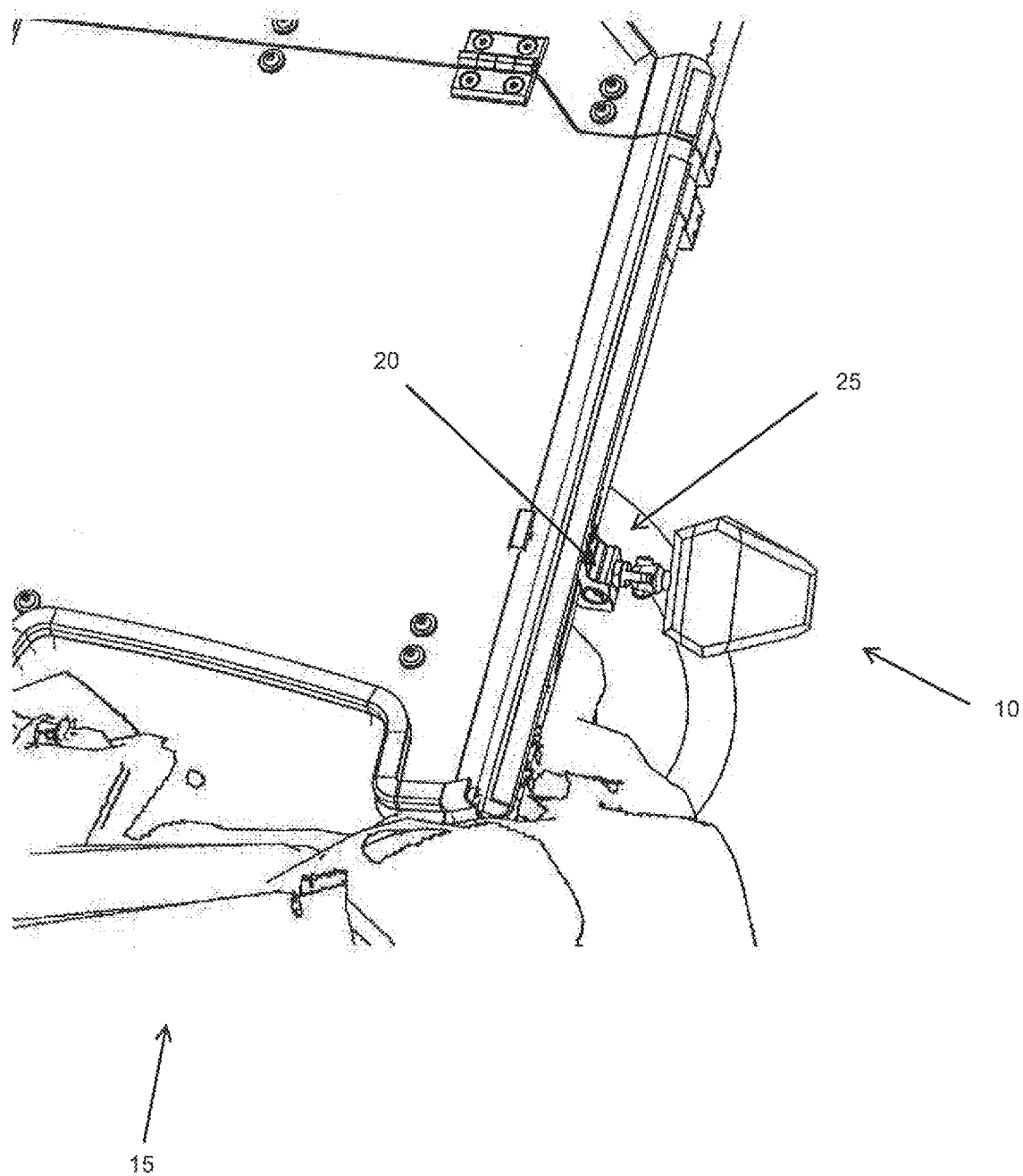
FIG. 2 is a zoomed in view of the mirror mount assembly of FIG. 1.

FIG. 2 is a zoomed in view of the mirror mount assembly 10 depicted in FIG. 1. As shown, the mirror mount assembly 10 is attached to the vehicle 15 via base 20. Base 20 is configured to securely attach the mirror mount assembly 10 to the frame of vehicle 15. Although shown as attached to vehicle 15 near the height of steering wheel 25, the base 20 may be attached at any suitable point along the frame of vehicle 15.

Figure 3:
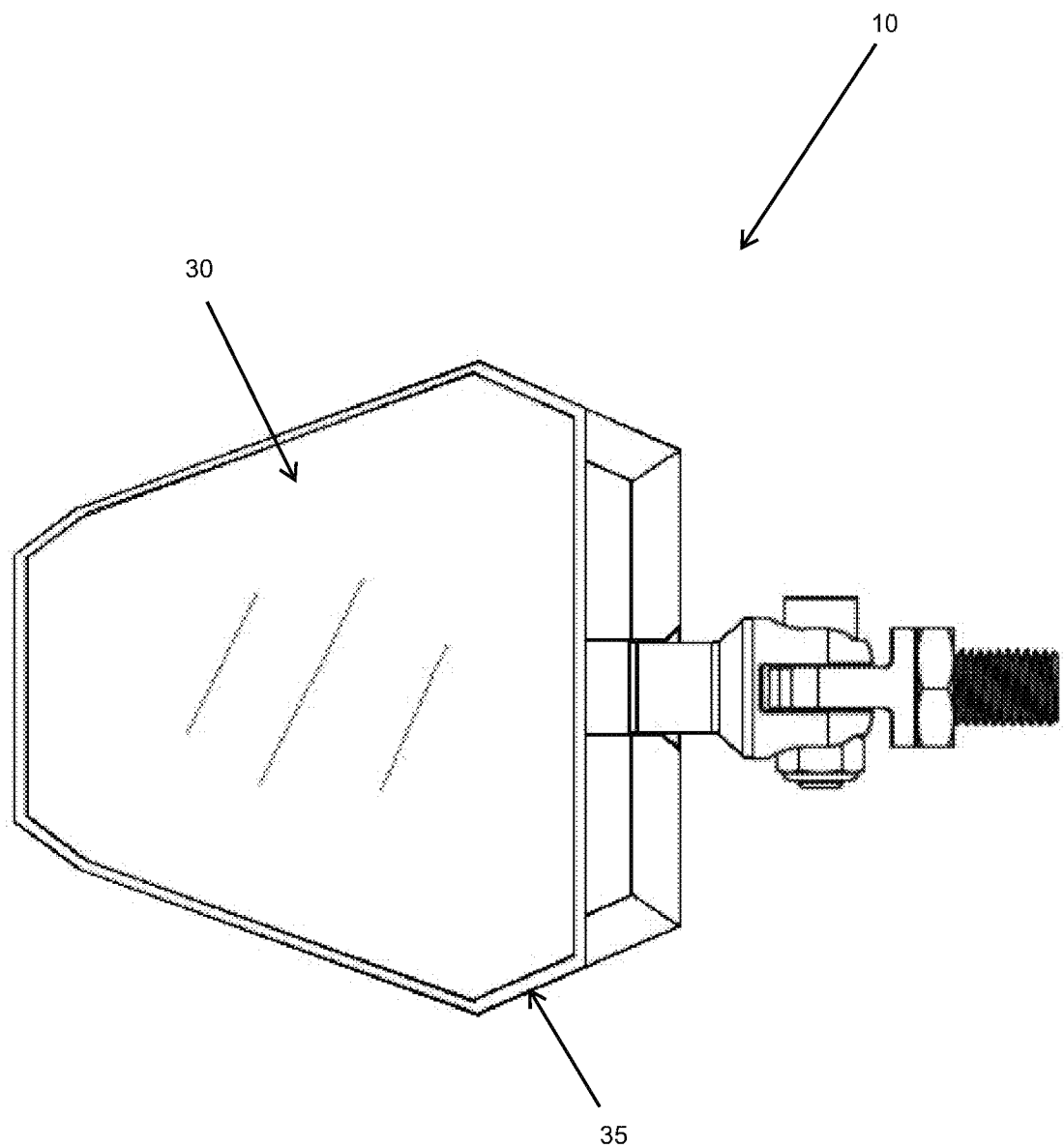
FIG. 3 is a front view of an embodiment of a mirror mount assembly of the present invention.

FIG. 3 is a front view of an embodiment of the mirror mount assembly 10 of the present disclosure. The mirror mount assembly 10 is configured to receive and secure a mirror or other reflective surface 30 to a first surface 35 of the mirror mount assembly 10. In the embodiment shown, the first surface 35 of the mirror mount assembly 10 generally has an irregular octagonal shape. However, it should be appreciated that, in other embodiments, mirror mount assembly 10 and/or the first surface 35 may be any suitable shape configured to correspond to the shape of the attached mirror 30.

The mirror mount assembly 10 is configured to pivot about two separate joints. The first joint is configured to allow a driver to adjust the mirror 30 in a vertical direction, when seated in the vehicle 15. The assembly 10 is further configured to compress said first joint, such that the amount of force required to adjust the assembly 10 and mirror 30 in the vertical direction is adjustable. The second joint allows the driver of vehicle 15 to rotate the assembly 10 and mirror 30 in a horizontal direction, when seated in the vehicle 15. Accordingly, the driver can adjust the vertical and horizontal angle of the mirror 30 to view a desired field of view rearward of vehicle 15, while also determining the amount of force required to move the assembly 10 and mirror 30 in the vertical direction. This ensures that mirror 30 is steady and stable at the desired field of view during operation of vehicle 15, regardless of the terrain that vehicle 15 is driven over.

Figure 4:
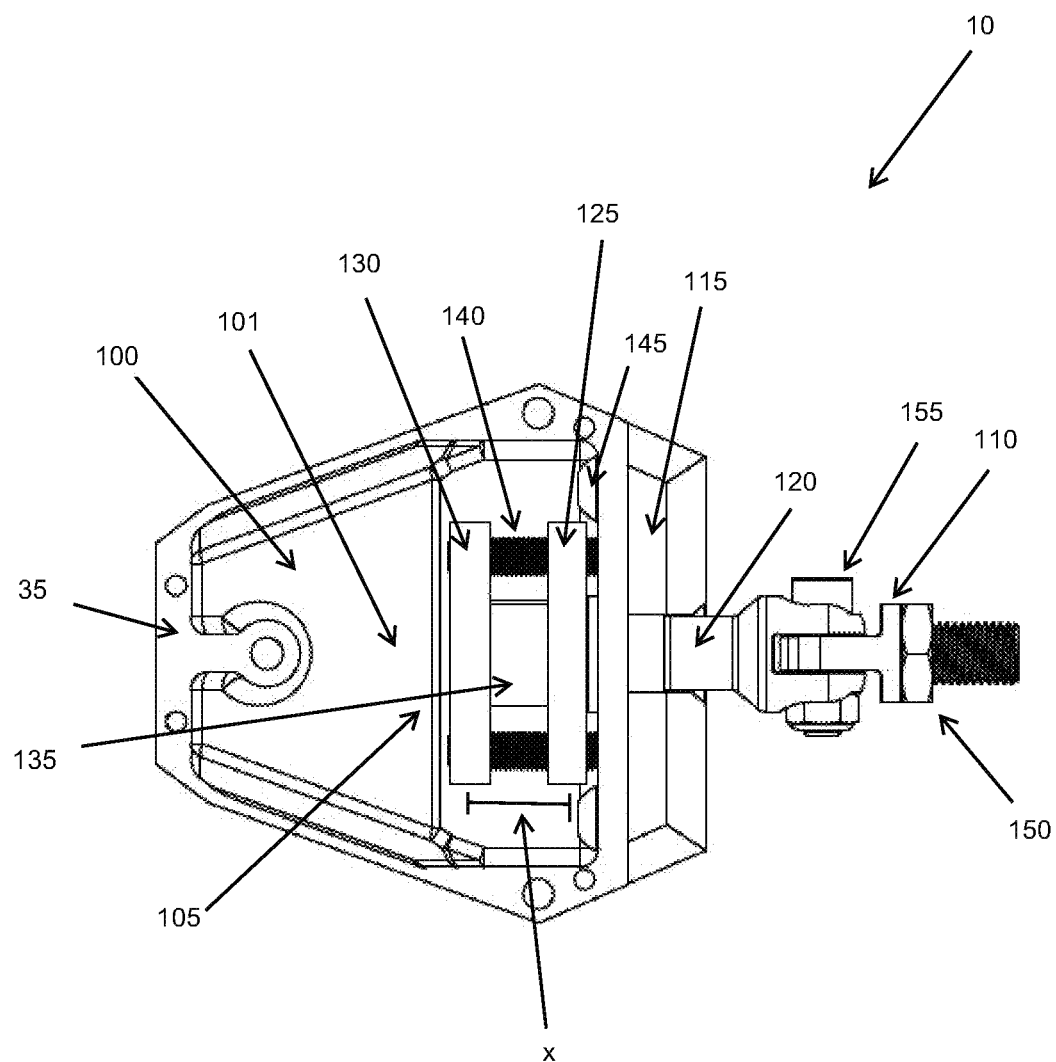
FIG. 4 is front view of the mirror mount assembly of FIG. 3 with the reflective surface removed for ease of illustration.

FIG. 4 depicts an embodiment of the mirror mount assembly 10 of the present disclosure. As shown, the mirror mount assembly 10 does not include a mirror or reflective surface 30, for illustration purposes. The mirror mount assembly 10 generally includes a mirror mount 100, a compression assembly 105, and a pivot base 110. The mirror mount 100 is configured to securely attach a reflective surface 30 to the first surface 35. Further, the mirror mount 100 defines a cavity 101 between the first surface 35 and a second surface 37 (see FIG. 9). The cavity 101 is configured to house at least part of the compression assembly 105.

The compression assembly includes a joint cap 115, a swivel post 120, a clamp plate 125, a clamp plate 130, a resilient member 135, and fasteners 140. Generally, the joint cap 115 is configured to secure one end of the swivel post 120 within the cavity 101 of mirror mount 100. The joint cap 115 itself is secured to the mirror mount 100 via a plurality of bolts 145.

The end of the swivel post 120 secured within the mirror mount 100 via the joint cap 115 defines the first joint, which is a swivel joint. The swivel joint is configured to allow the mirror mount 100 to rotate relative to the swivel post 120 in a first direction. Retention of the swivel post 120 by the joint cap 115 also creates a friction preload, thus establishing a minimum amount of force required to rotate the mirror mount 100 about the swivel post 120.

The amount of force is adjustable by tightening or loosening the fasteners 140, as follows. Inside the cavity 101, the end of the swivel post 120 is partially secured within a central bore (see FIG. 6) of the clamp plate 125. The resilient member 135 is configured to also fit within the central bore of the clamp plate 125. Further, the resilient member is secured between the first clamp plate 125 and the clamp plate 130. The clamp plate 125 and the clamp plate 130 are attached via the fasteners 140. As such, the resilient member 135 engages clamp plate 125 and presses clamp late 125 against the end of swivel post 120, establishing a point of friction. As the fasteners 140 are tightened, for example, the distance x between the clamp plate 125 and the clamp plate 130 is reduced. As this distance x is reduced, the amount of friction between the end of the swivel post 120 and clamp plate 125 increases, thus increasing the amount of force required to rotate the swivel joint (i.e., rotate the mirror mount 100 about the swivel post 120). The maximum distance the second clamp 130 can move towards the clamp plate 125 (i.e., the most amount of friction) is determined by the hardness/compressibility of the resilient member 135. As such, the amount of adjustability, or the range of adjustability, can be altered by using a harder or softer material for the resilient member 135. For example, a metal resilient member 135 will require little adjustment to reach maximum friction than a rubber and/or polyurethane resilient member 135. More specific aspects of the components are discussed below. resilient The opposing end of the swivel post 120 (i.e., the side not inserted into the cavity 101 of the mirror mount 100), is attached to the pivot base 110 via a fastener 155. The swivel post 120 and the pivot base 110, when attached, define the second joint, which is a post joint. The post joint is configured to allow the swivel post 120, and thus the mirror mount 100, to rotate relative to the pivot base 110 in a second direction. The rotation of the swivel post 120 relative to the pivot base 110 in the second direction is perpendicular relative to the rotation of the mirror mount 100 relative to the swivel post 120 in the first direction, discussed more below.

The pivot base 110 is configured to secure the mirror mount assembly 10 to the vehicle 15 by utilizing nut 150. In some embodiments, the pivot base 110 is attached directly to the frame of vehicle 15. In other embodiments, as shown in FIGS. 1 and 2, the pivot base 110 is attached to a base 20 via the nut 150 to secure the mirror mount assembly 10 to the vehicle 15. Other embodiments use other attachment mechanisms, as will be appreciated by one of skill in the art.

Figure 5:
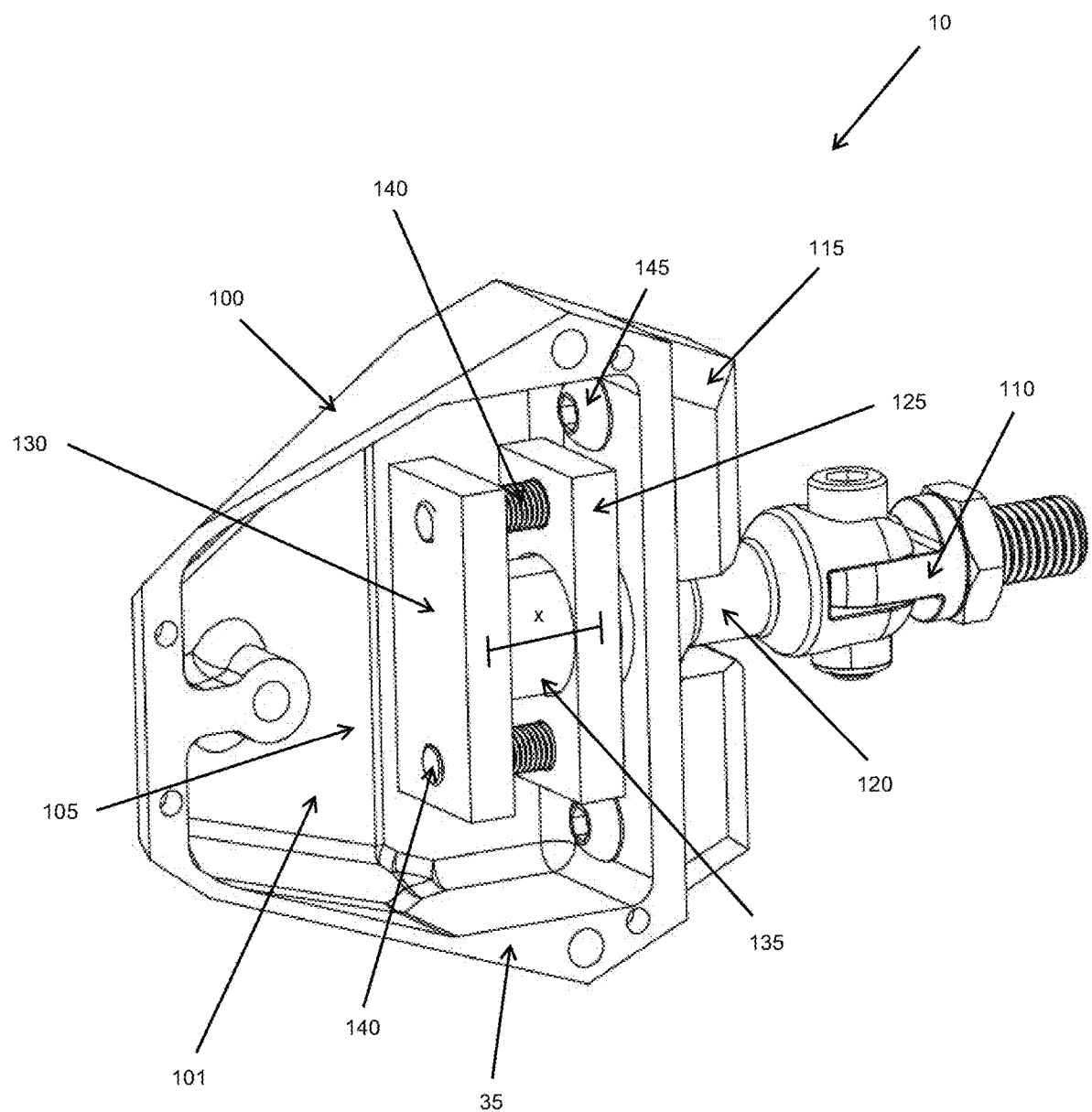
FIG. 5 is a perspective view of the mirror mount assembly of FIG. 2.

FIG. 5 is a side perspective view of the mirror mount assembly 10 illustrated in FIG. 4. As shown, the cavity 101 of the mirror mount 100 houses the end of the swivel post 120, the clamp plate 125, the clamp plate 130, the resilient member 135, and the fasteners 140. As such, a portion of the compression assembly 105 is housed within the cavity 101 of the mirror mount 100 when a reflective surface 30 is attached to the first surface 35 of the mirror mount 100.

Figure 6:
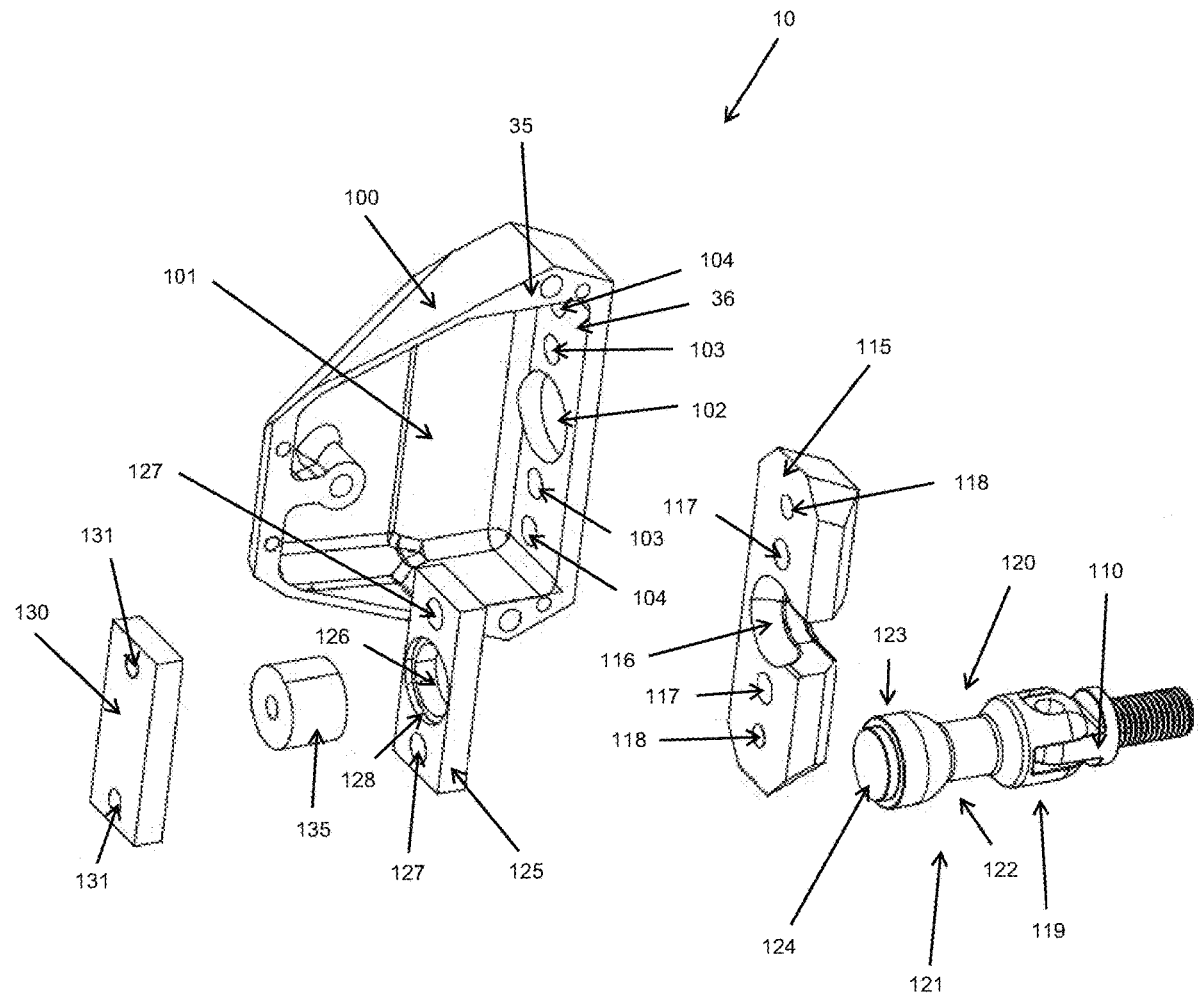
FIG. 6 is a perspective, exploded view of the mirror mount assembly of FIG. 2.

FIG. 6 is an exploded view of the mirror mount assembly 10 shown in FIG. 5. As shown, the inner surface 36 of the mirror mount 100 includes a plurality of bores 102, 103, 104. The central bore 102 is located at the center of the inner surface 36. The central bore 102 is configured to receive the end of the swivel post 120. Said differently, the central bore 102 allows the end of the swivel post 120 to be inserted into the cavity 101 of the mirror mount 100. Fastener bores 103 are located opposite each other on the inner surface 36 relative to the central bore 102. Fastener bores 103 are configured to receive fasteners 140 therethrough. However, fastener bores 103 are not configured to securely attach to fasteners 140, for example, via threading. On the other hand, bolt bores 104 are configured to securely attach to bolts 145. Bolt bores 104 are located opposite each other relative to central bore 102 on inner surface 36 further from central bore 102 than fastener bores 103.

Similar to the structure of the inner surface 36 of the mirror mount 100, the joint cap 115 also includes a plurality of bores 117, 118. The bores 117 are configured to line up with bores 103 of the mirror mount 100 and bores 118 are configured to line up with bores 104 of the mirror mount 100, respectively. Specifically, bores 117 are configured to receive fasteners 140 and bores 118 are configured to securely attach to bolts 145. The bores 118 of joint cap 115, however, do not extend through the entire width of the joint cap 115. Insertion of bolts 145 through bores 104 and bores 118 securely fastens the joint cap 115 to the mirror mount 100. Joint cap 115 also includes a central slot 116. The central slot 116 is configured to line up with the central bore 102 of the mirror mount 100. The central slot 116 defines an opened recess configured to receive and hold the end of the swivel post 120. Further, the central slot 116 is configured to have a similar shape as the end of the swivel post 120. Engagement of the central slot 116 with the end of the swivel post 120 creates the friction preload mentioned above.

The end of swivel post 120 is identified by a bottleneck portion 121. Opposite the bottleneck portion 121 is an interlocking/clasp portion 119, configured to interlock with and attach to the pivot base 110 via fastener 155. The bottleneck portion 121 generally has a bottleneck shape that includes a top end 122 and a bottom end 123. The top end 122 includes a narrower, cylindrical section that tapers into a larger diameter section. The top end 122 is held and secured by the central slot 116 of the joint cap 115. As such, the central slot 116 has a narrow section that tapers into a larger diameter section. The bottom end 123 includes the larger diameter section and extends cylindrically. The bottom end 123 is the portion of the swivel post 120 that is inserted into the cavity 101 of the mirror mount. Further, the bottom end 123 of the bottleneck portion 121 of the swivel post 120 terminates in a friction plate 124. The friction plate 124 is inserted into a central bore of the clamp plate 125 and engages the resilient member 135.

The clamp plate 125 includes a plurality of bores 126, 127. The central bore 126 aligns with the central bore 102 located on the inner surface 36 of the mirror mount 100. The central bore 126 is configured to receive the friction plate 124 of the swivel post 120. Insertion of the friction plate 124 into the central bore 126 aligns the swivel post 120 in relation to the rest of the compression assembly 105. Said differently, the central bore 126 aligns the swivel post 120 by constraining the outer circumference of the friction plate 124. The central bore 126 also includes an edge 128 configured to receive the resilient member 135. The edge 128 has a larger diameter than the rest of central bore 126. As such, the resilient member 135 has a larger diameter than the friction plate 124. The bores 127 are configured to securely receive fasteners 140 and are configured to align with bores 103 and bores 117.

The clamp plate 130 includes a plurality of bores 131. The bores 131 are configured to securely receive fasteners 140. Further, bores 131 align with bores 103, 117, and 127.

The resilient member 135, as shown is securely attached between the clamp plate 125 and the clamp plate 130. The resilient member 135 is further configured to be placed on the edge 128 in the central bore 126 of the clamp plate 125. As such, the resilient member 135 engages the friction plate 124 of the swivel post 120. In this embodiment, the resilient member 135 is made of polyurethane. The inventors have found that polyurethane allows the resilient member 135 to be sufficiently compressible while simultaneously durable enough to withstand increased force. Additionally, the friction coefficient of polyurethane has been found to be well suited in this application. In other embodiments, other similar materials that have similar friction coefficients may be used, such as rubber.

Methods of assembling a mirror mount assembly 10 are also disclosed. The top end 122 of the bottleneck portion 121 of the swivel post 120 is inserted into the central slot 116 of the joint cap 115. The joint cap 115 is secured to the mirror mount 100 by threading bolts 145 through bores 104 and 118. While securing the joint cap 115 to the mirror mount 100, the bottom end 123, including the friction plate 124, of the swivel post 120 are inserted through central bore 102 of the mirror mount 100. Attachment of the swivel post 120 to the mirror mount 100 via the joint cap 115 defines the swivel joint, mentioned earlier. The clamp plate 125 is placed such that the friction plate 124 of the swivel post 120 is inserted within the central bore 126 of the plate 125. The resilient member 135 is placed on the edge 128 in the central bore 126 of the clamp plate 125. The clamp plate 130 is then secured to the assembly by inserting fasteners 140 through bores 117, 103 and securely attaching fasteners 140 to bores 127, 131. The clasp portion 119 includes two arms. The clasp portion 119 of the swivel post 120 is attached to the pivot base 110 by inserting the pivot base 110 between the arms of the clasp portion 119 inserting fastener 155. Attachment of the swivel post 120 to the pivot base 110 defines the pivot joint, mentioned earlier. The pivot base 110 is attached directly or indirectly to the vehicle 15.

Figure 7:
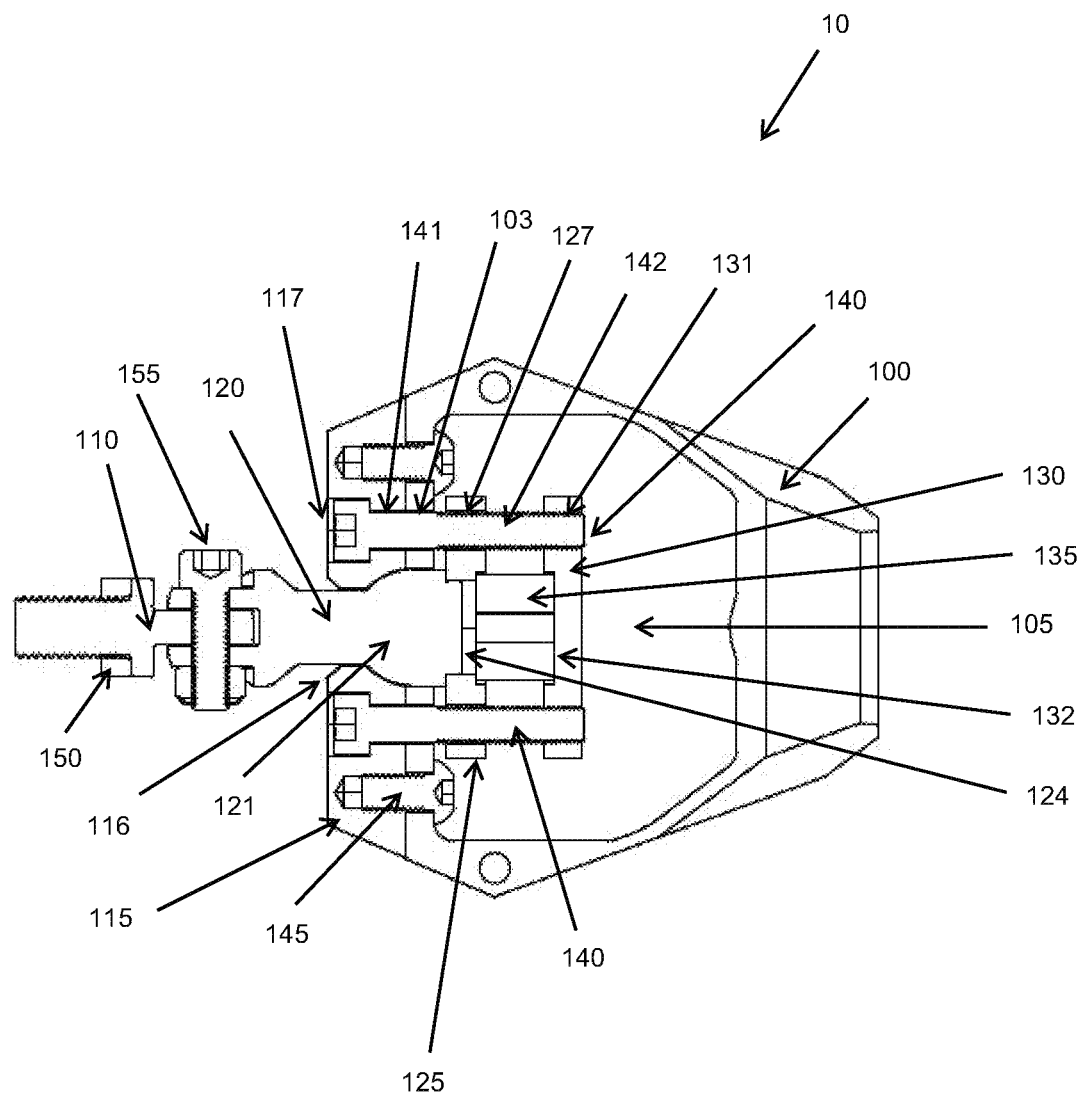
FIG. 7 is a cross sectional, rear view of the mirror mount assembly of FIG. 2.

FIG. 7 depicts a cross sectional, rear view of an assembled mirror mount assembly 10. As shown, the central slot 116 of the joint cap 115 has the same general shape as the bottleneck portion 121 of the swivel post 120. Specifically, the central slot 116 of the joint cap 115 has a narrow section that tapers outward that secures the bottleneck portion 121 of the swivel post 120 when the joint cap 115 is securely attached to the mirror mount 100.

As shown, fasteners 140 includes a non-threaded portion 141 and a threaded portion 142. Bores 117, 103, 127, and 131 align such that fastener 140 can be inserted through said bores simultaneously. However, bores 117 and 103 do not secure the fastener 140, as these bores receive the non-threaded portion 141 of the fastener 140. Bores 127 and 131 securely receive and attach to fasteners 140 via the threaded portion 142. Accordingly, fasteners 140 are only securely attached to the clamp plate 125 and the clamp plate 130. Therefore, movement of fasteners 140 only effects the distance between plates 125 and 130.

In this embodiment, the clamp plate 130 include a slot 132. The slot 132 is configured to hold the resilient member 135 in place, such that the resilient member 135 will not slip off of the clamp plate 130 during adjustment of the compression assembly 105 by tightening or loosening of the fasteners 140. In other embodiments, the surface of the clamp plate 130 has a generally flat shape.

Figure 8:
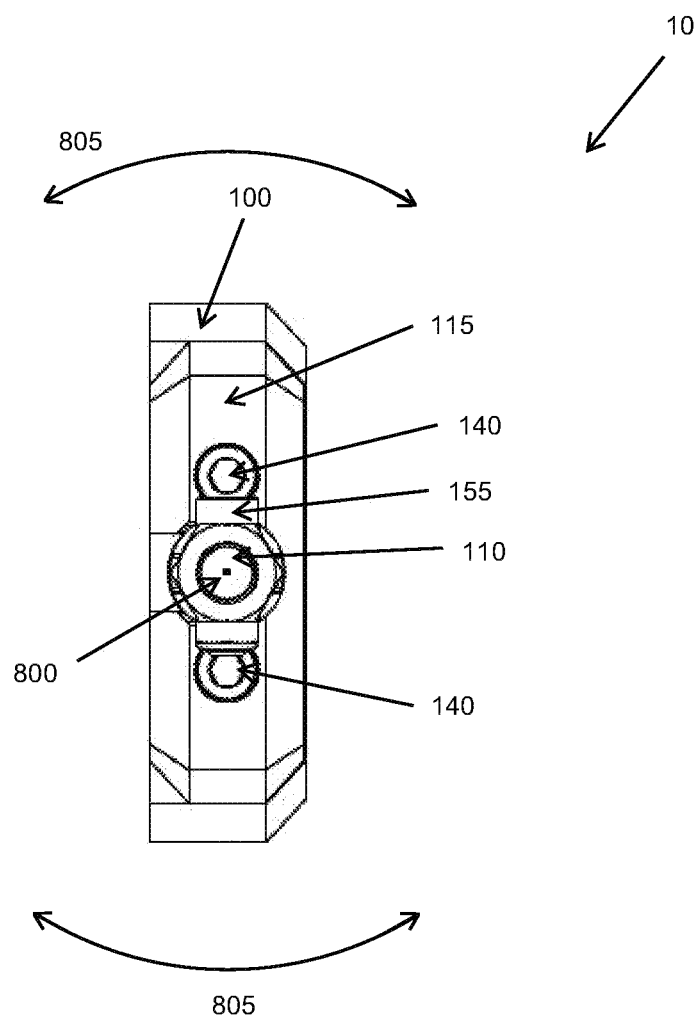
FIG. 8 is a side view of the mirror mount assembly of FIG. 2, looking at the end of the pivot base.

FIG. 8 depicts a side view of an assembled mirror mount assembly 10. FIG. 8 further illustrates the first direction of rotation, the rotation of the swivel pivot created by attaching the swivel post 120 to the mirror mount 100 via the joint cap 115. Specifically, the mirror mount 100 can rotate relative to the swivel post 120 about axis 800, as shown by arrows 805. The swivel pivot allows the mirror mount 100 to rotate 360° relative to the swivel post 120. This allows for a driver to adjust the vertical angle of the mirror 30, from the perspective of the driver seat. Additionally, this allows the mirror 30 to face the opposite direction (i.e., not viewable from the driver seat), in the event the mirror 30 is used for another purpose while the vehicle 15 is not operational (e.g., as reflectors while the vehicle 15 is parked).

Again, tightening of fasteners 140 increases the friction between the resilient member 135 and the friction plate 124, engaged within the central bore 126 of the clamp plate 125.

The increased friction increases the amount of force required to rotate the mirror mount about axis 800 in the direction of arrows 805. The opposite is also true. Loosening of fasteners 140 decreases the amount of friction between the resilient member 135 and the friction plate 124. This, in turn, reduces the amount of force required to rotate the mirror mount 100 about axis 800.

Figure 9:
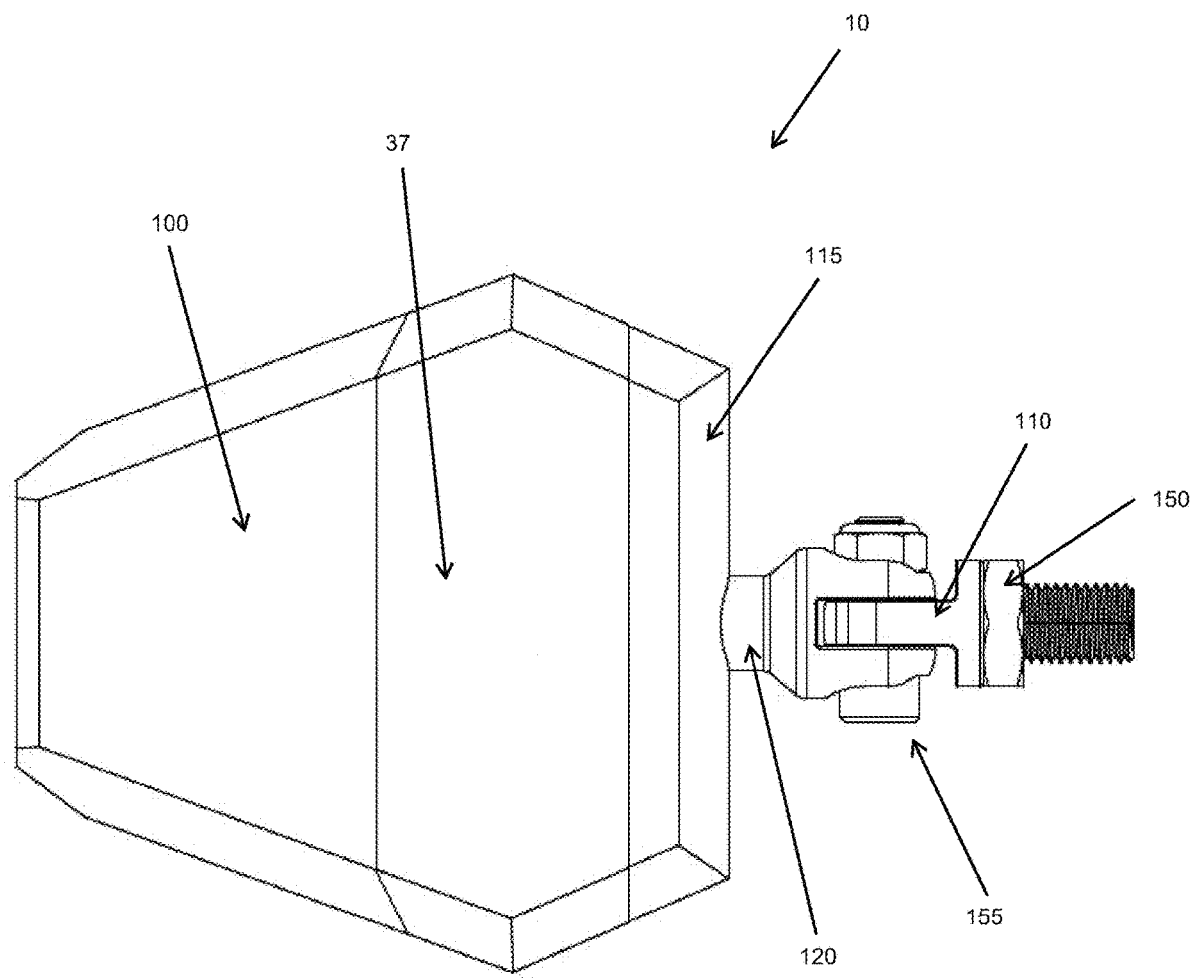
FIG. 9 is a rear view of the mirror mount assembly of FIG. 2.

FIG. 9 depicts a rear view of a mirror mount assembly 10. The mirror mount 100 includes a second surface 37 that, along with the first surface 35, defines the cavity 101 of the mirror mount 100 that houses a portion of the compression assembly 105.

Figure 10:
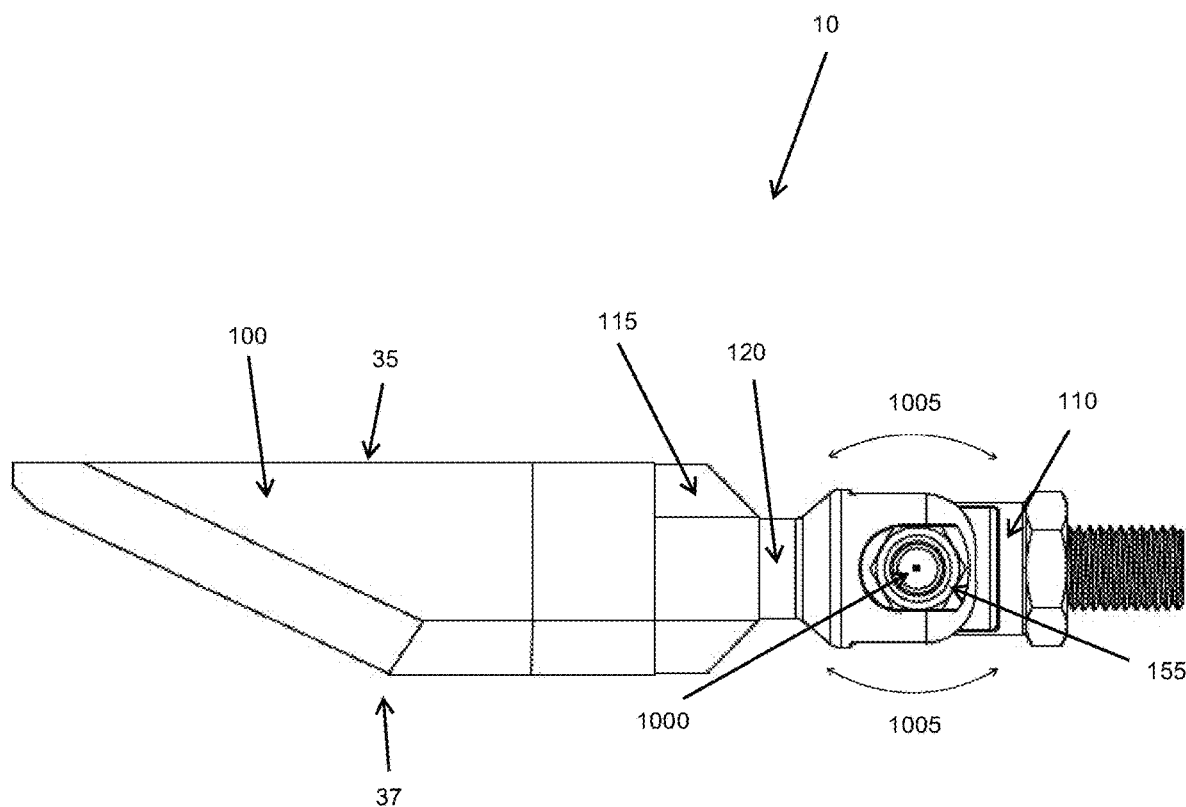
FIG. 10 is a top view of the mirror mount assembly of FIG. 2.

FIG. 10 is a top view of an assembled mirror mount assembly 10. FIG. 10 illustrates the second direction of rotation, the rotation of the swivel post 120 relative to the pivot base 110. Specifically, the swivel post 120, and therefore the mirror mount 100 and the compression assembly 105, can rotate relative to pivot base 110 about axis 1000, as shown by arrows 1005. The post joint defined by attachment of the swivel post 120 to the pivot base 110 allows the mirror mount 100 to rotate relative to axis 1000 by at least 90° in either direction from the position shown in FIG. 10, such direction indicated by arrows 1005. The pivot joint allows a driver to alter and set the horizontal position of the mirror 30. As such, the driver can alter and set both the vertical angle and the horizontal angle of the mirror 30 to view a desired field of view.

Figure 11:
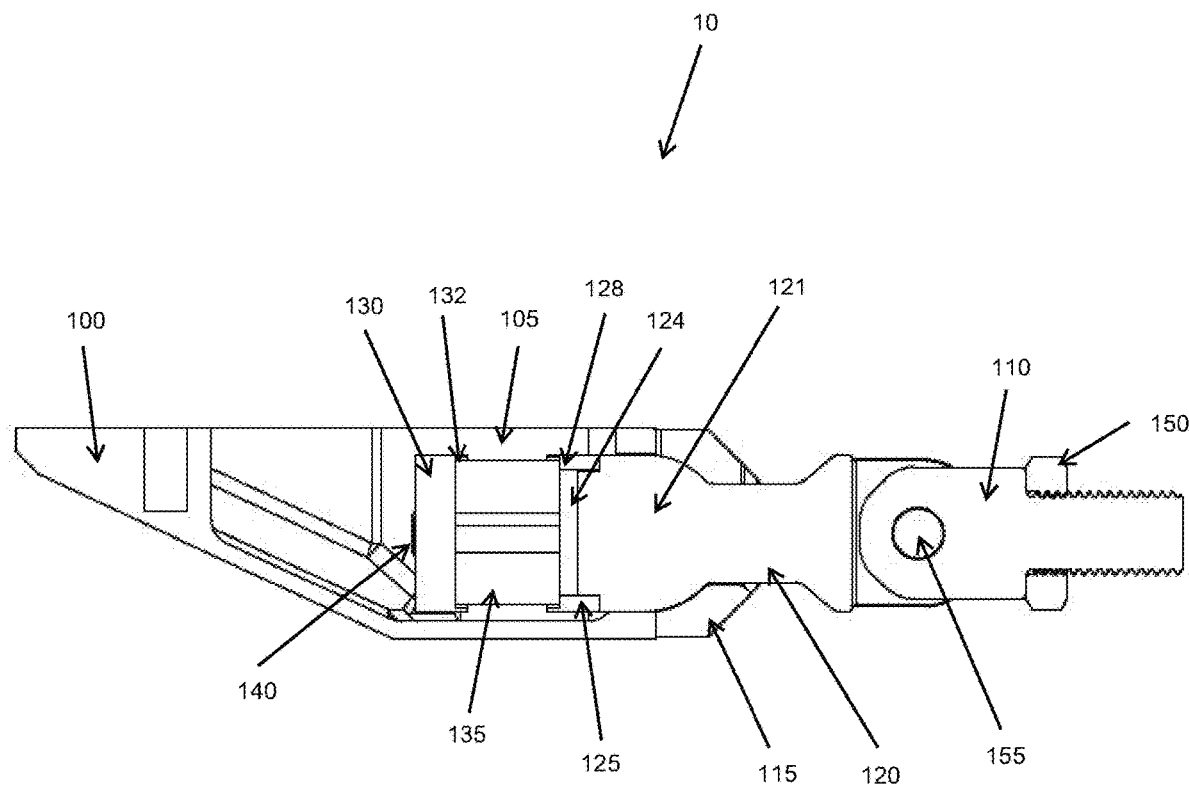
FIG. 11 is a cross sectional view of the mirror mount assembly illustrated in FIG. 8.

FIG. 11 is a cross sectional view of the view shown in FIG. 10. As the mirror mount 100 rotates about the swivel post 120 (as shown in FIG. 8) all of the components of the compression assembly 105, except for the swivel post 120, rotate with the mirror mount 100. The swivel post 120 cannot rotate about axis 800 as it is locked in place due to the connection of the clasp portion 119 of swivel post 120 with the pivot base 110. Accordingly, as the mirror mount 100 rotates, the friction plate 124 remains stationary while the resilient member 135 rotates with the mirror mount 100. So, compressing the resilient member 135 by tightening the fasteners 140 increases the friction between the friction plate 124 and the resilient member 135. Thus, more energy (i.e., force) is required to rotate the resilient member 135 relative to the friction plate 124 and consequently more force is required to rotate the mirror mount 100 about axis 800.

Therefore, the minimum amount of force needed to rotate the mirror mount 100 about axis 800 occurs when friction plate 124 and resilient member 135 are loosely engaged (i.e., the fasteners 140 are as loose as possible). In this scenario, the amount of force required to rotate the mirror mount 100 only needs to overcome the frictional forces between the swivel post 120 and the joint cap 115 and any minimal frictional forces between the friction plate 124 and the resilient member 135.

The maximum amount of force needed to rotate the mirror mount 100 about axis 800 occurs when friction plate 124 and resilient member 135 are fully engage (i.e., when resilient member 135 is fully compressed and the fasteners 140 are as tight as possible). In this scenario, the amount of force required to rotate the mirror mount 100 needs to overcome both the frictional forces between the resilient member 135 and the friction plate 124 as well as the friction between the swivel post 120 and the joint cap 115.

The uses of the terms "a" and "an" and "the" and similar references in the context of the disclosure (especially in the context of the following claims) are to be construed to cover both the singular and the plural unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the invention has been described in detail in the foregoing description, the same is to be considered as illustrative and not restrictive in character, it being understood that all changes and modifications that come within the spirit of the invention are desired to be protected. In addition, all references cited herein are indicative of the level of skill in the art and are hereby incorporated by reference in their entirety.

I claim:

1. A mirror mount assembly for a motor vehicle, the mirror mount assembly comprising:
    a mirror mount that defines a mount cavity, an opening that extends through the mirror mount from outside the mirror mount into the mount cavity and a surface adapted to receive a mirror;
    a post adapted to couple to the motor vehicle, wherein the post extends from outside the mirror mount into the mount cavity through the opening;
    a first plate positioned within the mount cavity; and
    a plurality of fasteners adapted to apply a first compression force to the first plate;
    wherein the first compression force generates a friction force that resists movement of the post relative to the mirror mount;
    wherein the first compression force is adjustable to permit selective movement of the post relative to the mirror mount and selective retention of the post relative to the mirror mount about a first axis of rotation.

2. The mirror mount assembly of claim 1, further comprising a second plate positioned within the mount cavity and a resilient member positioned between the first plate and the second plate, wherein the resilient member is positioned within the mount cavity, and wherein the first compression force compresses the resilient member between the second plate and the first plate.

3. The mirror mount assembly of claim 2, wherein the post abuts the second plate.

4. The mirror mount assembly of claim 3, further comprising a cap that is removable coupled to the mirror mount, wherein the cap defines a cap recess adapted to receive a portion of the post.

5. The mirror mount assembly of claim 4, wherein the post comprises a top portion, a middle portion and a lower portion, wherein the lower portion has a larger diameter compared to the middle portion and wherein the cap recess is adapted to receive the lower portion.

6. The mirror mount assembly of claim 5, wherein the cap defines a conical hole that corresponds to a shape of the lower portion of the post.

7. The mirror mount assembly of claim 6, wherein the second plate defines a first recess adapted to receive the top portion of the post.

8. The mirror mount assembly of claim 7, wherein the second plate defines a second recess adapted to receive a first end of the resilient member.

9. The mirror mount assembly of claim 8, wherein the first plate defines a third recess adapted to receive a second end of the resilient member.

10. The mirror mount assembly of claim 3, wherein the post can selectively rotate relative to the mirror mount 360°.

11. The mirror mount assembly of claim 3, wherein the plurality of fasteners extend through the mirror mount from outside the mirror mount into the mount cavity.

12. The mirror mount assembly of claim 11, wherein the plurality of fasteners are generally parallel to the post.

13. The mirror mount assembly of claim 11, wherein the plurality of fasteners extend through the mirror mount proximate to where the post extends through the mirror mount.

14. The mirror mount assembly of claim 2, wherein the resilient member is made of rubber and/or polyurethane.

15. The mirror mount assembly of claim 1, further comprising a pivot base and a swivel joint that couples the pivot base to the post, wherein the pivot base is adapted to permit selective rotation of the post relative to the pivot base and selective retention of the post relative to the pivot base about a second axis of rotation that is different than the first axis of rotation.

16. The mirror mount assembly of claim 15, wherein the first axis of rotation is perpendicular to the second axis of rotation.

17. The mirror mount assembly of claim 15, wherein swivel joint permits selective rotation of the post up to 180° relative to the pivot base.

18. The mirror mount assembly of claim 1, further comprising a mirror removably attached to the surface of the mirror mount.

19. The mirror mount assembly of claim 18, wherein the mirror mount extends around the mirror.

20. The mirror mount assembly of claim 1, wherein the mirror mount is selectively rotatable up to 360° relative to post.

\* \* \* \* \*